United States Patent
Tsuchihashi et al.

(10) Patent No.: US 9,091,038 B2
(45) Date of Patent: Jul. 28, 2015

(54) CONSTRUCTION MACHINE

(71) Applicant: Kobelco Construction Machinery Co., Ltd., Hiroshima-shi (JP)

(72) Inventors: Tomoyuki Tsuchihashi, Hiroshima (JP); Kazuhiro Ueda, Hiroshima (JP); Masaru Numasawa, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 12 days.

(21) Appl. No.: 13/644,186

(22) Filed: Oct. 3, 2012

(65) Prior Publication Data
US 2013/0081887 A1   Apr. 4, 2013

(30) Foreign Application Priority Data
Oct. 3, 2011   (JP) .................................. 2011-218938

(51) Int. Cl.
 *B60K 11/08* (2006.01)
 *B60K 11/06* (2006.01)
 *B60K 11/00* (2006.01)
 *E02F 9/08* (2006.01)
 (Continued)

(52) U.S. Cl.
 CPC ............... *E02F 9/0866* (2013.01); *B60K 11/04* (2013.01); *B60K 11/06* (2013.01); *B60K 11/08* (2013.01); *B62D 25/082* (2013.01); *F01P 11/10* (2013.01); *F01P 11/12* (2013.01); *B60Y 2200/412* (2013.01); *F01P 2001/005* (2013.01)

(58) Field of Classification Search
 CPC ........ B62B 25/20; B60K 11/00; B60K 11/06; B60K 11/08
 USPC ........................................ 180/68.1, 68.2, 69.1
 See application file for complete search history.

(56) References Cited

U.S. PATENT DOCUMENTS 3,788,418 A * 1/1974 Clancy et al. ................. 180/68.4
4,189,020 A * 2/1980 Abels et al. ................... 180/68.1
(Continued)

FOREIGN PATENT DOCUMENTS

EP   1 571 046 A1   9/2005
EP   1 873 316 A2   1/2008
(Continued)

OTHER PUBLICATIONS

Extended European Search Report issued Mar. 22, 2013 in European Patent Application No. 12186921.8.

*Primary Examiner* — J. Allen Shriver, II
*Assistant Examiner* — Travis Coolman
(74) *Attorney, Agent, or Firm* — Oblon, McClelland, Maier & Neustadt, L.L.P.

(57) ABSTRACT

A construction machine includes an exhaust duct for discharging a lower airflow to the exterior of an engine room. An air inlet for introducing air into the exhaust duct is provided in an upper portion of the exhaust duct, and an air outlet for discharging the air from the exhaust duct is provided in a lower portion of the exhaust duct. An air passage is formed in the interior of the exhaust duct between the air inlet and the air outlet. The exhaust duct is disposed on an exhaust side of the engine room such that the air introduced into the air passage in the exhaust duct through the air inlet is discharged below the engine room from the air outlet through a discharge port, and such that a hydraulic pump provided on the exhaust side of the engine room is shielded from the discharge port by the exhaust duct.

8 Claims, 5 Drawing Sheets

(51) Int. Cl.
  *B62D 25/08* (2006.01)
  *F01P 11/10* (2006.01)
  *B60K 11/04* (2006.01)
  *F01P 11/12* (2006.01)
  *F01P 1/00*  (2006.01)

(56) References Cited

U.S. PATENT DOCUMENTS

| | | | | |
|---|---|---|---|---|
| 5,816,351 | A * | 10/1998 | Akira et al. | 180/68.1 |
| 6,192,839 | B1 * | 2/2001 | Takeshita et al. | 123/41.49 |
| 6,390,770 | B1 * | 5/2002 | Takeshita | 415/119 |
| 6,431,299 | B1 * | 8/2002 | Asche et al. | 180/68.1 |
| 6,622,668 | B2 * | 9/2003 | Izumi | 123/41.49 |
| 6,745,860 | B2 * | 6/2004 | Yabe | 180/68.1 |
| 6,922,925 | B2 * | 8/2005 | Watanabe et al. | 37/466 |
| 7,131,422 | B2 * | 11/2006 | Kimura et al. | 123/198 E |
| 7,188,865 | B2 * | 3/2007 | Sugiyama et al. | 280/759 |
| 7,500,532 | B2 * | 3/2009 | Koga et al. | 180/89.13 |
| 7,523,804 | B2 * | 4/2009 | Tanaka et al. | 180/291 |
| 8,550,198 | B2 * | 10/2013 | Isaka et al. | 180/68.1 |
| 2001/0007292 | A1 * | 7/2001 | Yabf | 180/68.1 |
| 2002/0189874 | A1 * | 12/2002 | Sato et al. | 180/65.8 |
| 2003/0183432 | A1 * | 10/2003 | Suzuki | 180/68.1 |
| 2005/0188926 | A1 | 9/2005 | Kimura et al. | |
| 2007/0012495 | A1 * | 1/2007 | Shannon et al. | 180/68.1 |
| 2008/0041332 | A1 | 2/2008 | Sakitani et al. | |
| 2010/0219008 | A1 * | 9/2010 | Isaka et al. | 180/68.1 |
| 2013/0017048 | A1 * | 1/2013 | Kimura et al. | 414/687 |

FOREIGN PATENT DOCUMENTS

| | | |
|---|---|---|
| EP | 1 873 316 A3 | 1/2008 |
| JP | 2003-191758 A | 7/2003 |
| JP | 2004-90689 A | 3/2004 |
| JP | 2005-186910 | 7/2005 |
| JP | 2010-58591 A | 3/2010 |

\* cited by examiner

US 9,091,038 B2

CONSTRUCTION MACHINE

BACKGROUND OF THE INVENTION

1. Field of the Invention

The present invention relates to a construction machine such as a digger, in which an exhaust structure is provided to discharge a lower airflow that flows under an engine in an engine room.

2. Background Art

The background art will now be described, using a digger as an example of a construction machine.

As shown in FIG. 8, a digger includes a lower propelling body 1, an upper slewing body 2 that is carried on the lower propelling body 1 to be free to slew, various pieces of equipment and various devices carried on an upper frame 3 serving as a base of the upper slewing body 2, and a work attachment (also referred to as a digging attachment) 5 attached to a front portion of the upper frame 3. The various pieces of equipment carried on the upper frame 3 include a cabin 4. In FIG. 8, CW denotes a counterweight attached to a rear end portion of the upper frame 3.

Note that in this specification, a position of the cabin 4 is set as a left side front portion, and "front-rear" and "left-right" directions are based on the position of the cabin 4.

Further, to simplify the drawings and the description, detailed illustration and description of respective portions of the upper frame, which are not directly related to the present invention, have been omitted.

An engine room 7 housing an engine 6 is provided in a rear portion of the upper frame 3.

FIG. 9 is a schematic sectional view showing an arrangement of devices in the engine room 7 from a back surface side.

As shown in FIG. 9, the engine room 7 is a space that is long in the left-right direction and surrounded by a base plate 8 of the upper frame 3, an engine guard member 9 such as a panel material, the counterweight CW shown in FIG. 8, and so on. A bottom surface of the engine room 7 is formed by the base plate 8 of the upper frame 3. The engine 6 is disposed in the engine room 7 via a mounting member, not shown in the drawing, so as to extend in the left-right direction.

Meanwhile, a left-right pair of vertical plates 10, 11 doubling as reinforcing members and attachment mounting members are provided in an intermediate portion, in a vehicle width direction, of the base plate 8 of the upper frame 3. The vertical plates 10, 11 are provided at an interval in the left-right direction so as to extend perpendicularly to the base plate 8 along substantially an entire length of the base plate 8 in the front-rear direction. The engine 6 is disposed above the vertical plates 10, 11.

As a result, a ventilation gap S through which air can pass is formed in the engine room 7 below the engine 6.

Further, a fan 12 and a heat exchanger 13 such as a radiator or an oil cooler are provided on one side of the engine 6, or more specifically a right side of the engine 6, while a hydraulic pump 14 is provided on an opposite side of the engine 6, or more specifically a left side of the engine 6. An intake port 15 is provided in the vicinity of a right end of an upper surface wall covering an upper surface of the engine room 7. When the fan 12 is rotated, outside air is taken into the engine room 7 through the intake port 15, and the intake air forms a cooling airflow that flows through the engine room 7 from the right side to the left side. The heat exchanger 13 and the engine 6 are cooled by this airflow.

Japanese Patent Application Publication No. 2005-186910 discloses a conventional technique for improving a discharge performance of a lower airflow, which forms a part of the aforesaid airflow that passes through the ventilation gap S, as shown by an arrow in FIG. 9. This conventional technique will now be described on the basis of FIG. 9.

In this conventional technique, a fire wall 17 is provided on the left side, or in other words the hydraulic pump 14 side, of the engine room 7. The fire wall 17 is provided to partition the engine 6 from the hydraulic pump 14. The fire wall 17 is provided to prevent mist-form oil that is leaked or scattered from the hydraulic pump 14 from falling onto the engine 6, or more accurately an exhaust system of the engine 6 including a muffler 16.

Further, an air passage forming member 18 is attached between a lower end of the fire wall 17 and the base plate 8 of the upper frame 3. The air passage forming member 18 is formed in an inverted L shape such that an upper portion thereof is disposed horizontally and a lower portion is disposed vertically. An air passage 19 that communicates with the ventilation gap S is formed by the air passage forming member 18, the left vertical plate 10, and the base plate 8 of the upper frame 3. Further, an exhaust chamber 20 is defined in a left side region of the engine room 7 by the air passage forming member 18 and the fire wall 17.

Furthermore, an air passage outlet 21 is formed to open in a vertical part of the air passage forming member 18. A lower portion exhaust port 22 is opened in a part of the base plate 8 of the upper frame 3 that forms a lower surface of the exhaust chamber 20. An upper portion exhaust port 23 is provided in a part of an upper surface wall of the engine guard member 9 that forms an upper surface of the exhaust chamber 20. The lower airflow passing through the ventilation gap S enters the exhaust chamber 20 through the air passage 19 and the air passage outlet 21, and is discharged to the outside through the two exhaust ports 22, 23.

With the configuration described above, the lower airflow is caused to flow smoothly on the exhaust side, thereby improving an air discharge performance.

Incidentally, in the conventional technique described above, the hydraulic pump 14 penetrates the fire wall 17 so as to infiltrate the exhaust chamber 20. Therefore, the hydraulic pump 14 can be seen clearly from the exterior of the exhaust chamber 20 through the two exhaust ports 22, 23, and as a result, pump noise cannot be blocked completely from the outside. Hence, an increase in pump noise leakage to the outside, including "direct sound" emitted directly to the exterior of the exhaust chamber 20 from the hydraulic pump 14, occurs.

Furthermore, in the conventional technique described above, when an attempt is made to reduce pump noise leakage using a sound absorbing material such as glass wool, a sufficient sound absorption effect cannot be obtained unless the sound absorbing material is provided over a wide range of the exhaust chamber 20, including the vicinity of the exhaust ports 22, 23.

Therefore, an amount of used sound absorbing material increases, leading to an increase in cost, and moreover, when the sound absorbing material is provided over a wide range of the exhaust side, devices disposed on the exhaust side, not shown in the drawings, cannot easily be installed due to limitations on sizes and positions of the devices.

SUMMARY OF THE INVENTION

An object of the present invention is to suppress pump noise leakage from a construction machine while improving an air discharge performance of a lower airflow that flows under an engine, and when a sound absorbing material is provided, to facilitate device installation while securing a superior sound absorption effect with a small amount of the sound absorbing material.

A construction machine according to an aspect of the present invention includes: an engine room; a floor constituting a bottom surface of the engine room; an engine provided in the engine room such that a ventilation gap is formed below the engine; a hydraulic pump provided in the engine room on an exhaust side serving as one side of the engine; a fan which is provided in the engine room on an intake side serving as an opposite side of the engine to the hydraulic pump, and which, when the fan is rotated, generates a cooling airflow that includes a lower airflow passing through the ventilation gap and flows from the intake side to the exhaust side; and an exhaust duct formed of a hollow body to discharge the lower airflow to an exterior of the engine room, wherein a discharge port is provided in a part of the floor on the exhaust side, an air inlet for introducing air into the exhaust duct is provided in an upper portion of the exhaust duct, an air outlet for discharging the air from the exhaust duct is provided in a lower portion of the exhaust duct, an air passage is formed in an interior of the exhaust duct between the air inlet and the air outlet, and the exhaust duct is disposed on the exhaust side of the engine room such that the air introduced into the air passage in the exhaust duct through the air inlet is discharged below the engine room from the air outlet through the discharge port and the hydraulic pump is shielded from the discharge port by the exhaust duct.

DETAILED DESCRIPTION OF THE EMBODIMENTS OF THE INVENTION

In accordance with the description of the background art, embodiments to be described below are applied to a digger serving as an example of the construction machine according to the present invention.

(First Embodiment)

First, a first embodiment of the present invention will be described with reference to FIGS. 1 to 5.

Figure 8:
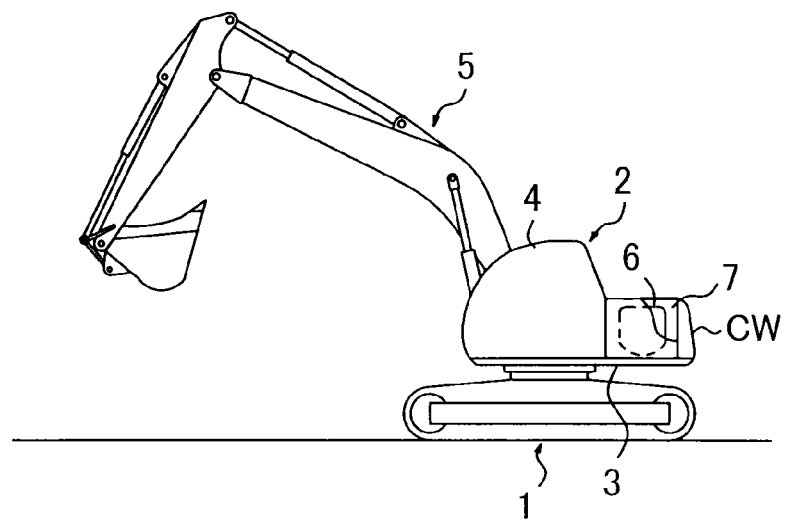
FIG. 8 is a schematic side view showing a digger serving as an example of a construction machine to which the present invention is applied.
Figure 9:
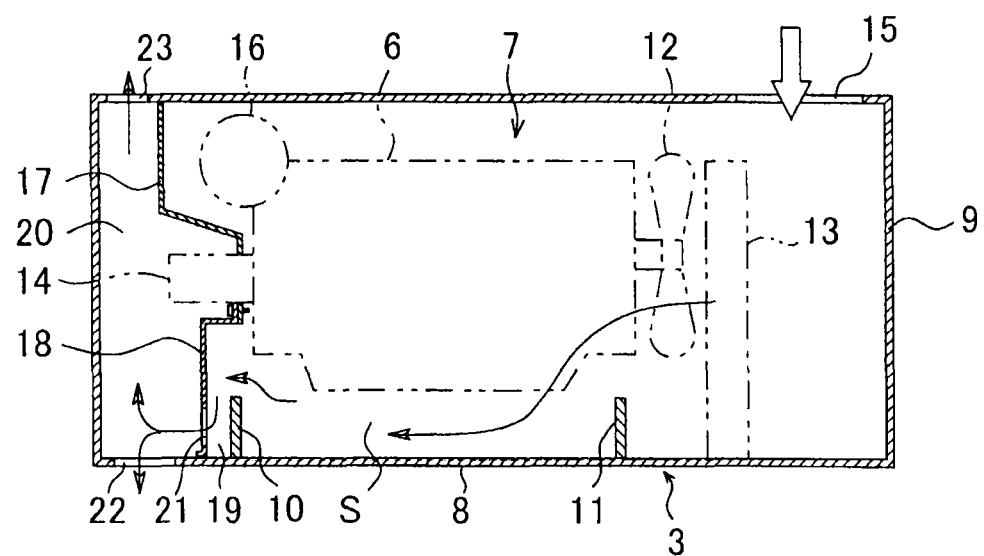
FIG. 9 is a schematic sectional view showing an engine room according to a conventional technique and devices disposed therein.

In the first embodiment, following points (i) to (v) are identical to the background art and conventional technique illustrated in FIGS. 8 and 9.

(i) An engine room 37 (see FIG. 4) housing an engine 36 is provided in a rear portion of an upper frame 33.

(ii) The engine room 37 is a space that is long in a left-right direction and formed by being surrounded by a base plate 38 of the upper frame 33, an engine guard member 39 such as a panel material, a counterweight (not shown) attached to a rear end portion of the upper frame 33, and so on. The base plate 38 of the upper frame 33 corresponds to a floor forming a bottom surface of the engine room 37. The engine 36 is disposed in the engine room 37 via a mounting member, not shown in the drawing, so as to extend in the left-right direction.

(iii) A left-right pair of vertical plates 40, 41 doubling as reinforcing members and attachment mounting members are provided in an intermediate portion of the base plate 38 of the upper frame 33 in a vehicle width direction of the lower propelling body 1. The vertical plates 40, 41 are provided at an interval in the left-right direction so as to extend perpendicularly to the base plate 38 along substantially an entire length of the base plate 38 in a front-rear direction. The engine 36 is disposed above the vertical plates 40, 41. As a result, a ventilation gap S (see FIG. 4) through which air can pass is formed in the engine room 37 below the engine 36. More specifically, the ventilation gap S is formed between the engine 36 and the base plate 38 of the upper frame 33.

(iv) A hydraulic pump 44 is provided in the engine room 37 on one side of the engine 36, or more specifically a left side of the engine 36, while a fan 42 and a heat exchanger 43 such as a radiator or an oil cooler are provided on an opposite side of the engine 36 to the hydraulic pump 44, or in other words a right side of the engine 36. An intake port 45 is provided in the vicinity of a right end of an upper surface wall of the engine guard member 39 covering the engine room 37. When the fan 42 is rotated, outside air is taken into the engine room 37 through the intake port 45, and the intake air forms a cooling airflow that flows through the engine room 37 from the right side to the left side. The airflow includes a lower airflow that passes through the ventilation gap S, and the heat exchanger 43 and engine 36 are cooled by this airflow.

(v) A fire wall 47 is provided in the engine room 37 on the left side, or in other words the hydraulic pump 44 side. The fire wall 47 is provided to partition the engine 36 from the hydraulic pump 44. The fire wall 47 is provided to prevent mist-form oil that is leaked or scattered from the hydraulic pump 44 from falling onto the engine 36, or more accurately an exhaust system of the engine 36 including a muffler 46.

Note that in FIGS. 1 to 3 and FIG. 6, which shows a second embodiment to be described below, W denotes a partition plate provided on the base plate 38 of the upper frame 33 in front of the engine room 37 so as to extend in the left-right direction.

In the first embodiment, with the configurations described above as prerequisites, an air discharge port 48 (see FIGS. 1 and 4) that communicates with the ventilation gap S is formed between the fire wall 47 and an upper end of the exhaust side vertical plate 40 positioned on the left side, and a discharge port 49 is provided in the floor on a downstream side of the lower airflow relative to the exhaust side vertical plate 40 positioned on the exhaust side of the engine room 37, or in other words the left side. In other words, the discharge port 49 is provided in a part of the base plate 38 of the upper frame 33 which is positioned on the left side of the exhaust side vertical plate 40.

An exhaust duct 50 is provided on the discharge port 49. The lower airflow passing through the air discharge port 48 is discharged downward to the outside from the discharge port 49 through the exhaust duct 50.

More specifically, an air inlet 51 for introducing air into the exhaust duct 50 is provided in an upper end of the exhaust duct 50, and a downwardly oriented air outlet 52 that communicates with the discharge port 49 is provided in a lower end of the exhaust duct 50. A part of the exhaust duct 50 between the upper end air inlet 51 and the lower end air outlet 52 forms an air passage 53. The air duct 50 is formed as an independent hollow body and provided such that the air introduced into the air passage 53 through the air inlet 51 is discharged below the engine room 37 from the air outlet 52 through the discharge port 49.

Figure 1:
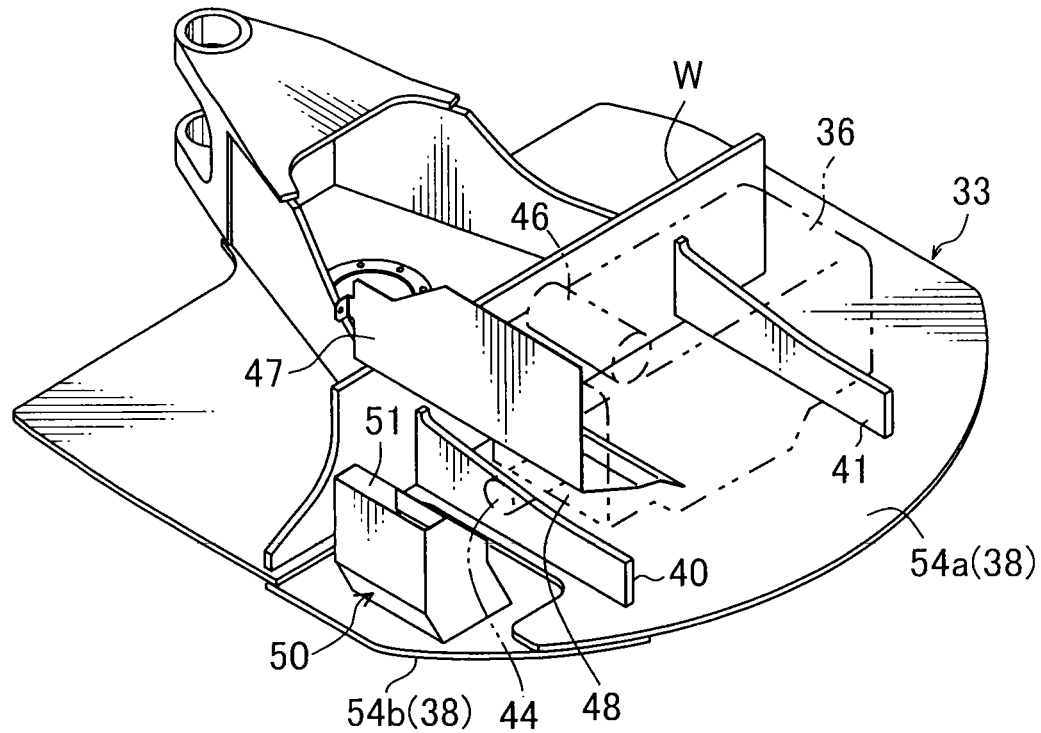
FIG. 1 is a schematic perspective view showing an upper frame including an exhaust duct, which is provided in a construction machine according to a first embodiment of the present invention.
Figure 2:
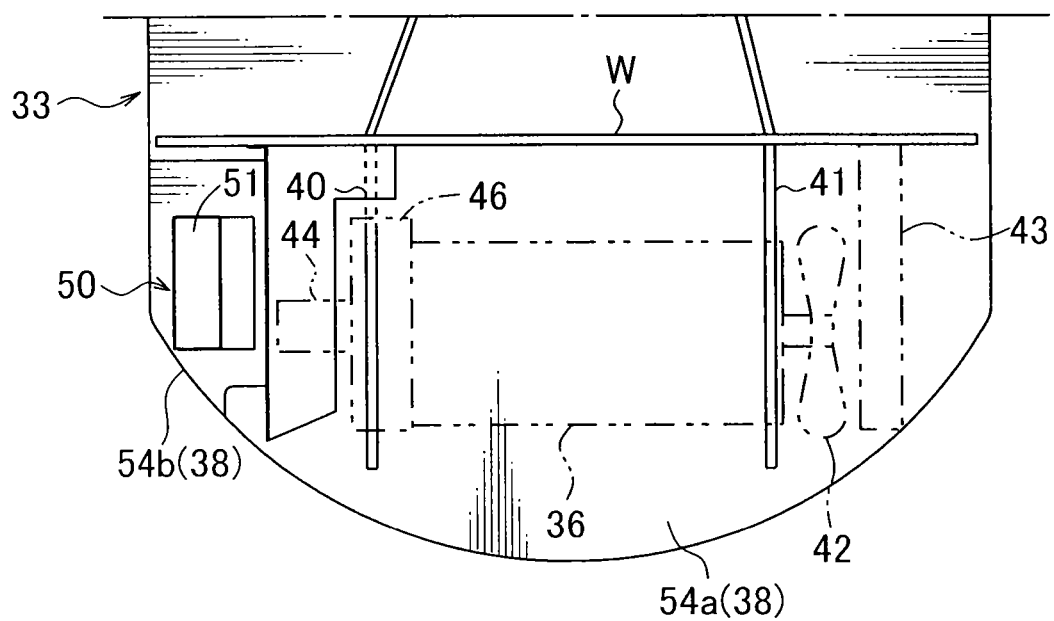
FIG. 2 is a schematic plan view showing a rear portion of the upper frame shown in FIG. 1.
Figure 3:
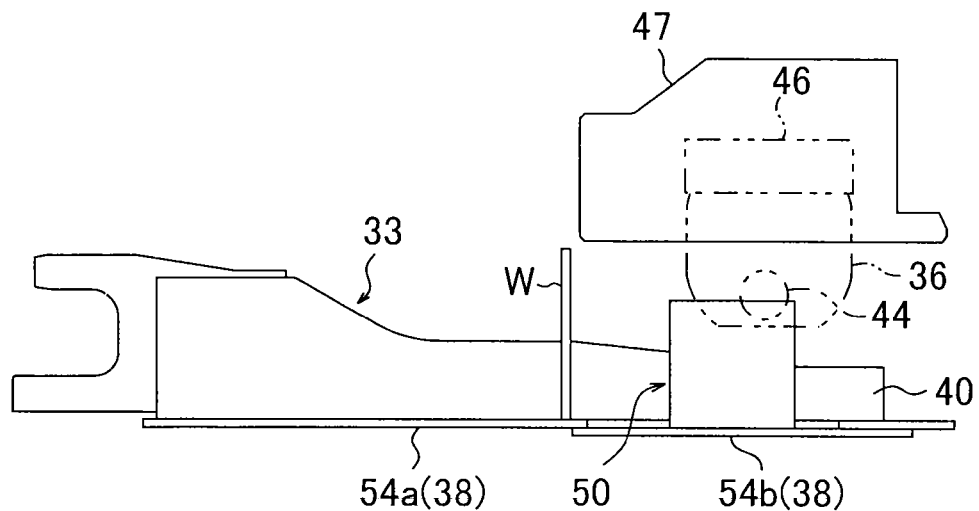
FIG. 3 is a schematic side view showing the upper frame shown in FIG. 1.

Incidentally, an outer periphery of a rear end portion of the base plate 38 of the upper frame 33, including the part that forms the bottom surface of the engine room 37, is typically formed in a substantially arc-shaped form, as shown in FIGS. 1 and 2, in order to minimize a slewing radius of the upper slewing body 2.

Accordingly, a rear end of the engine room 37 likewise takes a substantially arc-shaped form that extends along the outer periphery of the rear end portion of the upper frame 33.

In the first embodiment, as shown in FIGS. 1 to 4, the base plate 38 of the upper frame 33 is composed of a main base plate 54a and a duct base plate 54b. The main base plate 54a consists mostly of the base plate 38. A specific part of the main base plate 54a which corresponds to a left rear end portion of the base plate 38 is cut away. Specifically, the cutaway part of the main base plate 54a is located in a specific region of the base plate 38, the specific region being located on the rear side of the partition plate W and the left side of the exhaust side vertical plate 40. The duct base plate 54b is attached to the main base plate 54a so as to cover the cutaway part. The discharge port 49 is provided in an area of the duct base plate 54b which is located on the inside of the cutaway part. The exhaust duct 50 is mounted on the duct base plate 54b such that the exhaust duct 50 is located on the inside of the outer periphery of the left rear end portion of the upper frame 33. More specifically, the duct base plate 54b has an outer edge which extends along the outer periphery of the left rear end portion of the upper frame 33, and the outer edge is formed in a shape symmetrical to a shape of an outer edge of the right rear end portion of the main base plate 54a (the base plate 38). The exhaust duct 50 is located on the inside of the outer edge of the duct base plate 54b.

In this case, the exhaust duct 50 is provided so as to shield the hydraulic pump 44 from the discharge port 49. More specifically, the hydraulic pump 44 is not directly visible from the outside of the engine room 37 through the discharge port 49. In other words, the shape, size, and disposal position of the exhaust duct 50 are set such that the hydraulic pump 44 is shielded in this manner.

Further, the exhaust duct 50 has following features (a) and (b).

(a) With the aim of improving an effect of preventing leakage of pump noise, which is noise generated by the hydraulic pump 44, the exhaust duct 50 is formed in a bent shape including a single bent portion, as shown in the drawings, thereby substantially taking the form of a <symbol when seen from a back surface.

(b) The exhaust duct 50 is disposed below the fire wall 47 such that the air inlet 51 of the exhaust duct 50 and a lower edge of the air discharge port 48 are disposed in substantially identical height positions.

Figure 4:
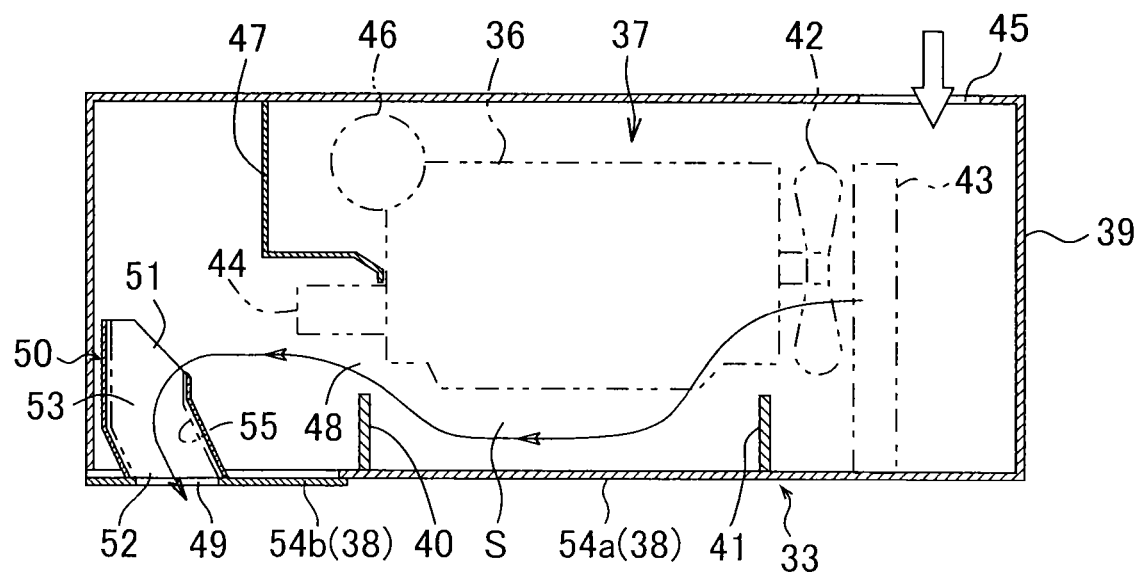
FIG. 4 is a schematic sectional view showing an engine room of the construction machine according to the first embodiment of the present invention and devices disposed therein.
Figure 5:
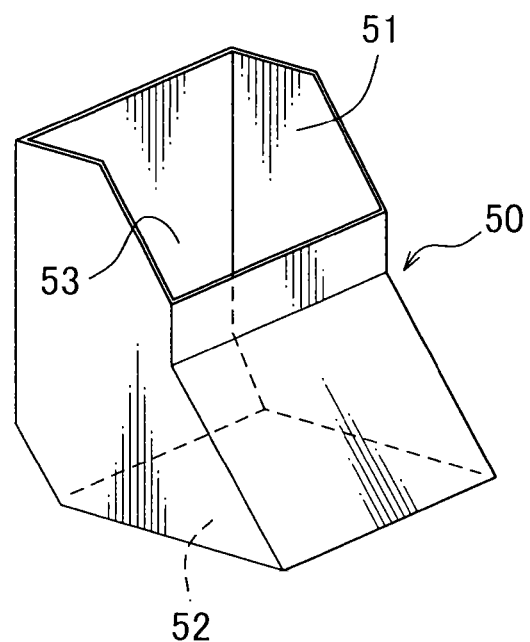
FIG. 5 is a perspective view showing the exhaust duct.

Note that typically, as shown by a dot-dot-dash line drawn inside the exhaust duct 50 in FIG. 4, a sound absorbing material 55 such as glass wool is adhered to an entire inner surface of the exhaust duct 50.

As described above, the exhaust duct 50 formed of a hollow body is provided on the exhaust side of the engine room 37 so as to shield the hydraulic pump 44 from the discharge port 49. Therefore, pump noise leakage from the discharge port 49 can be suppressed while discharging the lower airflow efficiently to the exterior of the engine room 37 through the exhaust duct 50.

Further, in a case where a sound absorbing material is provided to reduce noise, noise can be reduced simply by providing the sound absorbing material 55 in a concentrated fashion within a limited region such as the inner surface of the exhaust duct 50, and therefore a superior sound absorbing effect can be secured using the sound absorbing material 55 in a small amount. Moreover, in this case, an amount of space on the exhaust side occupied by the sound absorbing material 55 can be suppressed, and therefore size and position limitations on exhaust side devices can be relaxed, thereby facilitating installment of the devices.

Furthermore, according to this embodiment, following effects (I) to (V) can be obtained.

(I) The exhaust duct 50 (the air passage 53) is formed in a bent shape including a single bent portion, and therefore pump noise leakage can be suppressed even further by a sound reflection/damping effect generated inside the exhaust duct 50.

(II) To ensure that the entire hydraulic pump 44 is not directly visible from the exterior of the engine room 37 through the discharge port 49, the exhaust duct 50 is disposed such that the hydraulic pump 44 is completely shielded from the discharge port 49 by the exhaust duct 50. Therefore, "direct sound" from the hydraulic pump 44 that leaks directly to the outside through the exhaust duct 50 and the discharge port 49 can be prevented reliably. As a result, the noise reduction effect can be further improved.

(III) The exhaust duct 50 is disposed below the fire wall 47, and therefore the fire wall 47 can be prevented from applying resistance to the lower airflow. Hence, an exhaust performance, or in other words a performance relating to an amount of discharged air, can be improved.

(IV) The exhaust duct 50 is disposed on the downstream side of the lower airflow relative to the exhaust side vertical plate 40, and the fire wall 47 is provided such that the air discharge port 48 communicating with the ventilation gap S is formed between the fire wall 47 and the upper end of the exhaust side vertical plate 40. Hence, in a machine such as the digger cited in this embodiment, in which the vertical plates 40, 41 exist separately on the left and right sides of the engine room 37, the exhaust side vertical plate 40 does not obstruct the lower airflow, and as a result, a favorable airflow can be secured.

(V) A lower edge of the air inlet 51 of the exhaust duct 50 and the lower edge of the air discharge port 48 are disposed in substantially identical height positions, and therefore the lower airflow that passes through the air discharge port 48 from the ventilation gap S is introduced into the exhaust duct 50 as a substantially horizontal flow. Hence, little ventilation resistance is generated on a path along which the air is introduced into the exhaust duct 50 from the ventilation gap S, and as a result, the air discharge performance can be improved.

(Second Embodiment)

Figure 6:
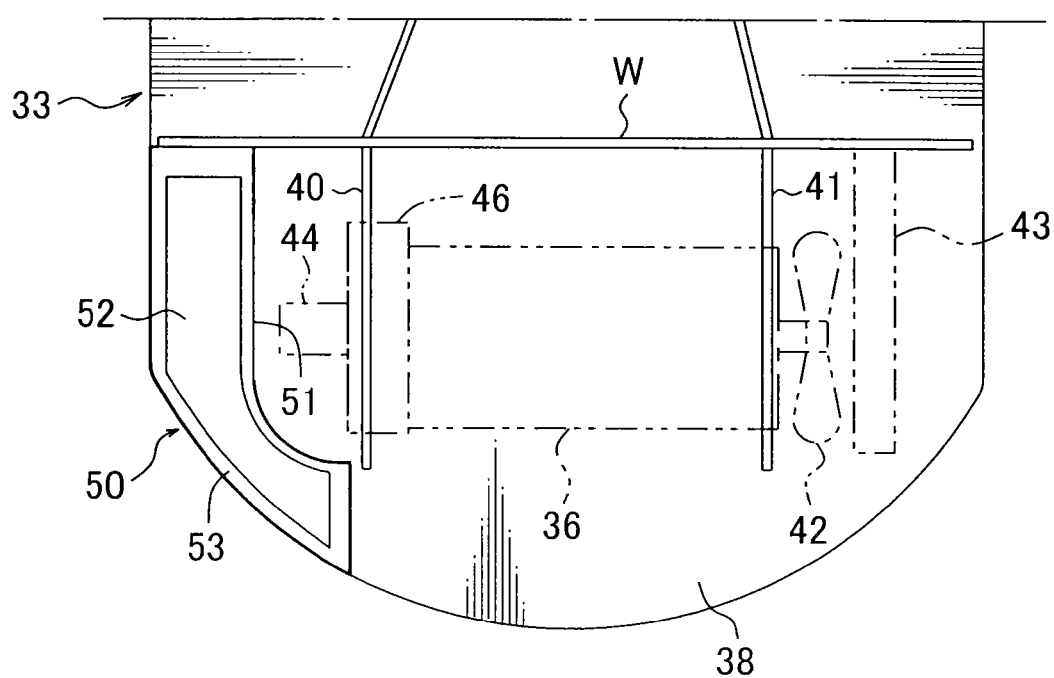
FIG. 6 is a view corresponding to FIG. 2 and showing an upper frame according to a second embodiment of the present invention.

Next, a second embodiment of the present invention will be described with reference to FIG. 6.

Note that only parts of the second embodiment and a following third embodiment that differ from the first embodiment will be described.

In the first embodiment, the exhaust duct 50 is mounted on the duct base plate 54*b* such that the exhaust duct 50 is located at a position which is separated slightly inward from the outer periphery of the left rear end portion of the upper frame 33. In the second embodiment, on the other hand, the exhaust duct 50 is provided on an inner side of the outer periphery of the engine room 37 so as to extend along the substantially arc-shaped outer periphery of the engine room 37 disposed in the rear end portion of the upper frame 33.

According to this configuration, the outer peripheral shape of the engine room 37 does not have to be modified in order to dispose the exhaust duct 50, and therefore large design modifications and improvements to the engine room 37 are not required.

(Third Embodiment)

Figure 7:
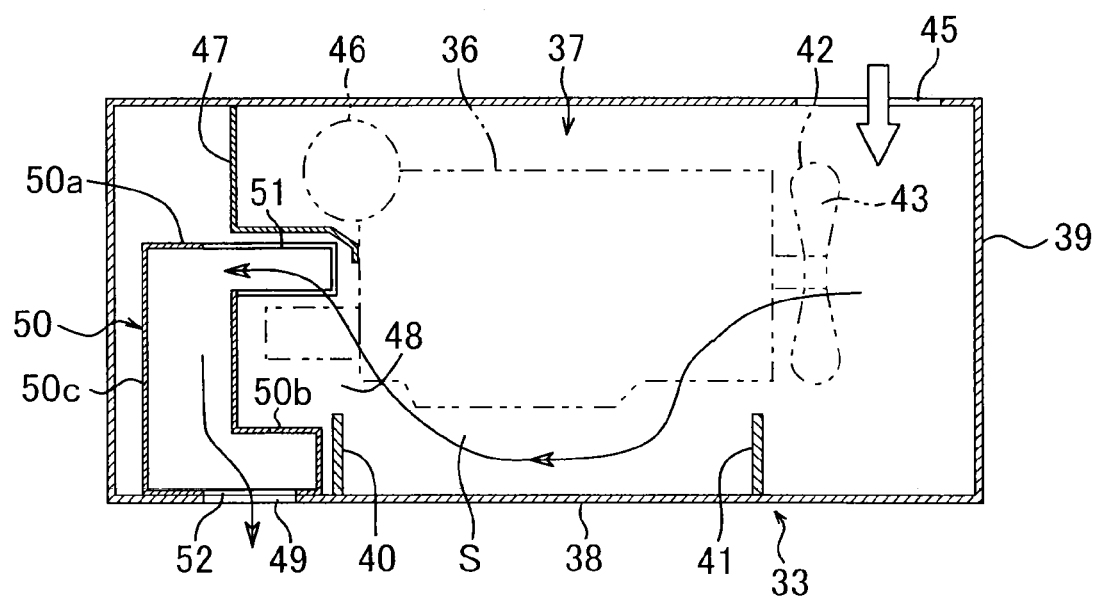
FIG. 7 is a view corresponding to FIG. 4 and showing an engine room of a construction machine according to a third embodiment of the present invention and devices disposed therein.

Next, a third embodiment of the present invention will be described with reference to FIG. 7.

In the third embodiment, the exhaust duct 50 includes an upper side portion 50*a* that extends horizontally in the left-right direction, a lower side portion 50*b* disposed below and parallel to the upper side portion 50*a* via an interval, and a vertical side portion 50*c* disposed perpendicularly to the upper side portion 50*a* and the lower side portion 50*b* so as to connect left end portions on identical sides of the upper side portion 50*a* and the lower side portion 50*b* to each other. Hence, the exhaust duct 50 is formed in the approximate shape of a U tipped onto its side when seen from a back surface. Further, the exhaust duct 50 is disposed such that the hydraulic pump 44 is sandwiched between the upper side portion 50*a* and the lower side portion 50*b*.

Note that the air inlet 51 of the exhaust duct 50 is formed over an upper wall, a right side wall and a lower wall on the engine 36 side, which constitute the upper side portion 50*a*. The air outlet 52 is formed in a lower wall of the lower side portion 50*b*.

According to the third embodiment, the exhaust duct 50 can be disposed without modifying the size and position of the hydraulic pump 44.

Further, as described above, the air inlet 51 can be formed to have a large opening area extending over a wide range of the upper side portion 50*a*, and therefore the amount of air taken into the exhaust duct 50 can be increased.

Furthermore, a length of the air passage 53 between the air inlet 51 and the air outlet 52 can be increased, and therefore the effect of reducing noise from the pump can be improved.

(Other Embodiments)

(1) The exhaust duct 50 may be formed in a bent shape including two or more bent portions.

(2) To ensure that the entire hydraulic pump 44 is not directly visible from the exterior of the engine room 37 through the discharge port 49, the exhaust duct 50 is preferably disposed such that the hydraulic pump 44 is completely shielded from the discharge port 49 by the exhaust duct 50, as in the above embodiments. In practical terms, however, as long as a required shielding effect in relation to the hydraulic pump 44, or in other words a required pump noise reduction effect, can be secured, the exhaust duct may be disposed to shield the hydraulic pump 44 from the outside while permitting a part of the hydraulic pump 44 to be directly visible from the outside.

(3) In the above embodiments, the exhaust duct 50 is formed as an independent hollow body, but a structure of the upper slewing body, such as the partition plate W, the engine guard member 39, or the counterweight, may be used as a part of the exhaust duct.

(4) The present invention is not limited to a digger, and may be applied widely to a construction machine in which an engine is disposed in an engine room formed in a rear portion of an upper frame, a fan is disposed on one side of the engine, a hydraulic pump is disposed on an opposite side of the engine to the fan, and a lower airflow that passes through a ventilation gap below the engine is generated. For example, the present invention may be applied to a demolition machine, a crusher, or the like formed using a digger as a base.

[Summary of the Embodiments]

The embodiments described above may be summarized as follows.

A construction machine according to the embodiments includes: an engine room; a floor constituting a bottom surface of the engine room; an engine provided in the engine room such that a ventilation gap is formed below the engine; a hydraulic pump provided in the engine room on an exhaust side serving as one side of the engine; a fan which is provided in the engine room on an intake side serving as an opposite side of the engine to the hydraulic pump, and which, when the fan is rotated, generates a cooling airflow that includes a lower airflow passing through the ventilation gap and flows from the intake side to the exhaust side; and an exhaust duct formed of a hollow body to discharge the lower airflow to an exterior of the engine room, wherein a discharge port is provided in a part of the floor on the exhaust side, an air inlet for introducing air into the exhaust duct is provided in an upper portion of the exhaust duct, an air outlet for discharging the air from the exhaust duct is provided in a lower portion of the exhaust duct, an air passage is formed in an interior of the exhaust duct between the air inlet and the air outlet, and the exhaust duct is disposed on the exhaust side of the engine room such that the air introduced into the air passage in the exhaust duct through the air inlet is discharged below the engine room from the air outlet through the discharge port and the hydraulic pump is shielded from the discharge port by the exhaust duct.

In this configuration, the exhaust duct formed of a hollow body is provided on the exhaust side of the engine room so as to shield the hydraulic pump from the discharge port connected to the outside. Therefore, pump noise leakage through the discharge port can be suppressed while discharging the lower airflow efficiently to the exterior of the engine room through the exhaust duct. Further, with this configuration, when a sound absorbing material is provided, pump noise can be absorbed effectively simply by providing the sound absorbing material in a concentrated fashion within a limited region such as an inner surface of the exhaust duct, and therefore a superior sound absorption effect can be secured with a small amount of the sound absorbing material. Moreover, size and position limitations on devices provided on the exhaust side can be relaxed, thereby facilitating installment of the devices.

In the construction machine described above, the air passage in the exhaust duct is preferably formed in a bent shape including at least one bent portion.

According to this configuration, a sound reflection/damping effect generated inside the exhaust duct is enhanced by the bent shape of the exhaust duct, and therefore pump noise leakage can be suppressed even further.

In the construction machine described above, the exhaust duct is preferably disposed to shield the hydraulic pump from the discharge port so that the hydraulic pump is not directly visible from the outside through the discharge port.

According to this configuration, "direct sound" can be prevented completely, enabling a further improvement in the noise reduction effect.

In the construction machine described above, a fire wall, which partitions the engine from the hydraulic pump, is preferably provided on the exhaust side of the engine room, and the exhaust duct is preferably disposed below the fire wall.

According to this configuration, the fire wall does not apply resistance to the lower airflow, and therefore the exhaust performance, or in other words the performance relating to the amount of discharged air, can be improved.

Preferably in this case, the construction machine further comprises a lower propelling body and an upper slewing body carried on the lower propelling body, the upper slewing body includes an upper frame, a left-right pair of vertical plates extending in a front-rear direction are provided in a central portion of the upper frame in a vehicle width direction of the lower propelling body, the engine room is formed in a rear portion of the upper frame, the engine is disposed in the engine room so as to extend in a left-right direction, and the exhaust duct is disposed on a downstream side of the lower airflow relative to a specific vertical plate of the left-right pair of vertical plates, the specific vertical plate disposed on the exhaust side, while the fire wall is provided such that an air discharge port which communicates with the ventilation gap is formed between the fire wall and an upper end of the vertical plate disposed on the exhaust side.

According to this configuration, in a machine such as a digger, in which the vertical plates exist on the left and right sides of the engine room, the exhaust side vertical plate does not obstruct the lower airflow, and as a result, a favorable airflow can be secured.

Also in this case, a lower edge of the air inlet in the exhaust duct and a lower edge of the air discharge port are preferably disposed in substantially identical height positions.

According to this configuration, the lower airflow that passes through the air discharge port from the ventilation gap is introduced into the exhaust duct as a substantially horizontal flow, enabling a reduction in ventilation resistance generated on a path along which the airflow is introduced into the exhaust duct from the ventilation gap. As a result, the air discharge performance can be improved.

In the construction machine described above, the exhaust duct preferably has an upper side portion, a lower side portion disposed below and parallel to the upper side portion via an interval, and a vertical side portion disposed perpendicularly to the upper side portion and the lower side portion so as to connect end portions on identical sides of the upper side portion and the lower side portion to each other, the exhaust duct disposed such that the hydraulic pump is sandwiched between the upper side portion and the lower side portion.

According to this configuration, the exhaust duct can be disposed without modifying the size and position of the hydraulic pump. Further, with this configuration, the air inlet can be formed to have a large opening area extending over a wide range of the upper side portion positioned in the upper portion of the exhaust duct, and therefore the amount of air taken into the exhaust duct can be increased. Furthermore, with this configuration, great length can be secured in the air passage between the air inlet and the air outlet, and therefore the pump noise reduction effect of the exhaust duct can be improved.

In the construction machine described above, the exhaust duct is preferably provided on an inner side of an outer periphery of the engine room so as to extend along the outer periphery of the engine room.

According to this configuration, the outer peripheral shape of the engine room does not have to be modified in order to dispose the exhaust duct, and therefore large design modifications and improvements to the engine room are not required.

According to the embodiments described above, pump noise leakage from a construction machine can be suppressed while improving an air discharge performance of a lower airflow flowing under an engine, and when a sound absorbing material is provided, device installation can be facilitated while securing a superior sound absorption effect with a small amount of the sound absorbing material.

This application is based on Japanese Patent application No. 2011-218938 filed in Japan Patent Office on Oct. 3, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A construction machine, comprising:
an engine room;
a floor constituting a bottom surface of the engine room;
an engine provided in the engine room such that a ventilation gap is formed below the engine;
a hydraulic pump provided in the engine room on an exhaust side serving as one side of the engine;
a fan which is provided in the engine room on an intake side serving as an opposite side of the engine to the hydraulic pump, and which, when the fan is rotated, generates a cooling airflow that includes a lower airflow passing through the ventilation gap and flows from the intake side to the exhaust side;
a vertical plate member standing up on the floor, the vertical plate member having an upper plate end located just below the hydraulic pump, the upper plate end allowing the airflow having passed through the ventilation gap to pass over the upper plate end to the exhaust side; and
an exhaust duct formed of a hollow body to discharge the lower airflow to an exterior of the engine room, wherein
a discharge port is provided in a part of the floor on the exhaust side of the vertical plate member,
the exhaust duct has a duct wall standing up on the floor around the discharge port and surrounding an air passage extending vertically above the discharge port, the air passage opened upward to form an air inlet and opened downward to form an air outlet, the duct wall having an upper portion and a lower end, the upper portion surrounding the air inlet at a position higher than the upper surface of the floor to allow the airflow having passed over the upper plate end to be introduced into the air passage through the air inlet at the position higher than the upper surface of the floor, the position allowing the duct wall under the air inlet to be interposed between the hydraulic pump and the discharge port so as to shield the discharge port from the hydraulic pump, the lower end forming the air outlet for discharging the air from the exhaust duct, and the air passage is formed in an interior of the exhaust duct between the air inlet and the air outlet, and the lower end of the duct wall is mounted on the floor to surround the discharge port and disposed on the exhaust side of the engine room such that the air introduced into the air passage in the exhaust duct through the air inlet is discharged below the engine room from the air outlet through the discharge port and the hydraulic pump is shielded from the discharge port by the exhaust duct.

2. The construction machine according to claim 1, wherein a fire wall, which partitions the engine from the hydraulic pump, is provided on the exhaust side of the engine room, and the exhaust duct is disposed below the fire wall.

3. The construction machine according to claim 2, further comprising a lower propelling body and an upper slewing body carried on the lower propelling body, wherein the upper slewing body includes an upper frame, a left-right pair of vertical plates including the vertical plate member are provided in a central portion of the upper frame in a vehicle width direction of the lower propelling body, each of the vertical plates extending in a front-rear direction, the engine room is formed in a rear portion of the upper frame, the engine is disposed in the engine room so as to extend in a left-right direction, and the exhaust duct is disposed on a downstream side of the lower airflow relative to a specific vertical plate of the left-right pair of vertical plates, the specific vertical plate disposed on the exhaust side, while the fire wall is provided such that an air discharge port which communicates with the ventilation gap is formed between the fire wall and an upper end of the vertical plate disposed on the exhaust side.

4. The construction machine according to claim 3, wherein a lower edge of the air inlet in the exhaust duct and a lower edge of the air discharge port are disposed in substantially identical height positions.

5. The construction machine according to claim 1, wherein the air passage in the exhaust duct is formed in a bent shape including at least one bent portion.

6. The construction machine according to claim 1, wherein the exhaust duct is disposed to shield the hydraulic pump from the discharge port so that the hydraulic pump is not directly visible from the outside through the discharge port.

7. The construction machine according to claim 1, wherein the exhaust duct has an upper side portion, a lower side portion disposed below and parallel to the upper side portion via an interval, and a vertical side portion disposed perpendicularly to the upper side portion and the lower side portion so as to connect end portions on identical sides of the upper side portion and the lower side portion to each other, the exhaust duct disposed such that the hydraulic pump is sandwiched between the upper side portion and the lower side portion.

8. The construction machine according to claim 1, wherein the exhaust duct is provided on an inner side of an outer periphery of the engine room so as to extend along the outer periphery of the engine room.

\* \* \* \* \*